United States Patent
Yao et al.

(10) Patent No.: US 7,048,349 B2
(45) Date of Patent: May 23, 2006

(54) COLOR PRINTING

(75) Inventors: Meng Yao, West Linn, OR (US); Mark R. Parker, Portland, OR (US)

(73) Assignee: Xerox Corporation, Stamford, CT (US)

( * ) Notice: Subject to any disclaimer, the term of this patent is extended or adjusted under 35 U.S.C. 154(b) by 326 days.

(21) Appl. No.: 10/756,058

(22) Filed: Jan. 12, 2004

(65) Prior Publication Data

US 2005/0151788 A1     Jul. 14, 2005

(51) Int. Cl.
   *B41J 2/205*    (2006.01)
   *G06K 15/00*    (2006.01)

(52) U.S. Cl. .......................... 347/15; 358/1.9; 358/1.2; 358/534

(58) Field of Classification Search .................. 347/15, 347/43; 358/1.2, 1.9, 3.01, 3.03, 3.3, 534; 399/39–40, 54
See application file for complete search history.

(56) References Cited

U.S. PATENT DOCUMENTS

| | | | |
|---|---|---|---|
| 5,568,169 A | * | 10/1996 | Dudek et al. .................. 347/43 |
| 5,767,876 A | * | 6/1998 | Koike et al. ................... 347/43 |
| 6,250,733 B1 | | 6/2001 | Yao et al. ...................... 347/15 |
| 6,290,330 B1 | * | 9/2001 | Torpey et al. ................. 347/43 |
| 2002/0176105 A1 | | 11/2002 | Kawai et al. |
| 2003/0011794 A1 | | 1/2003 | Yao et al. |
| 2003/0202193 A1 | | 10/2003 | Yokochi |

FOREIGN PATENT DOCUMENTS

EP    0583127 A    2/1994

OTHER PUBLICATIONS

Inventor: Stephen M. Kroon; U.S. Appl. No.: 10/280,216, filed Oct. 25, 2002.

Examiner C. Heiner, European Search Report for EP 05250107, May 2, 2005, Munich.

* cited by examiner

*Primary Examiner*—Lamson Nguyen
(74) *Attorney, Agent, or Firm*—Manuel Quiogue

(57) ABSTRACT

A method of printing including replacing each of black dots of a first subset of black dots of a bit map for a predetermined area with a process black dot, adding a non-black dot to each of black dots of a second subset of black dots of the bit-mapped data, and printing the bit map.

18 Claims, 4 Drawing Sheets

| 184 | 11 | 224 | 51 | 252 | 17 | 114 | 241 | 128 | 79 | 22 | 140 | 57 | 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | 2 | 142 | 96 | 220 | 73 | 119 | 55 | 162 | 13 | 254 | 141 | 208 |
| 8 | 187 | 244 | 81 | 183 | 238 | 29 | 171 | 12 | 246 | 35 | 205 | 126 | 43 | 177 | 61 |
| 145 | 101 | 23 | 154 | 116 | 52 | 137 | 201 | 103 | 147 | 181 | 85 | 230 | 76 | 111 | 239 |
| 44 | 217 | 63 | 229 | 32 | 210 | 92 | 59 | 225 | 66 | 123 | 9 | 151 | 212 | 16 | 194 |
| 82 | 122 | 178 | 132 | 74 | 172 | 253 | 5 | 165 | 42 | 240 | 199 | 98 | 50 | 130 | 159 |
| 30 | 251 | 3 | 202 | 106 | 18 | 143 | 113 | 197 | 138 | 78 | 33 | 175 | 247 | 65 | 222 |
| 169 | 88 | 152 | 46 | 237 | 189 | 67 | 219 | 25 | 105 | 214 | 156 | 121 | 4 | 186 | 109 |
| 203 | 53 | 221 | 124 | 77 | 158 | 39 | 95 | 168 | 245 | 14 | 68 | 233 | 93 | 148 | 20 |
| 97 | 136 | 15 | 176 | 34 | 213 | 135 | 234 | 45 | 87 | 146 | 193 | 37 | 207 | 48 | 243 |
| 60 | 232 | 192 | 94 | 250 | 108 | 0 | 190 | 125 | 206 | 58 | 112 | 164 | 83 | 131 | 179 |
| 1 | 157 | 72 | 26 | 153 | 54 | 166 | 75 | 21 | 161 | 226 | 10 | 255 | 24 | 223 | 117 |
| 91 | 211 | 127 | 235 | 118 | 200 | 227 | 100 | 248 | 47 | 134 | 182 | 99 | 149 | 56 | 195 |
| 249 | 62 | 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | 6 | 218 | 167 | 242 | 120 | 7 | 231 | 129 |

Change Each Process Black Dot and Each Black Plus Non-Black Dot to a Black Dot if Each of First and Second Dots Adjacent Such Process Black Dot or Black Plus Dot Comprises a Black Dot, A Black Plus Non-Black Dot, A Process Black Dot, or a White Dot — 311

↓

PRINT BIT-MAP — 313

COLOR PRINTING

BACKGROUND OF THE DISCLOSURE

The subject disclosure is generally directed to reducing artifacts in color printing.

Color printers typically employ a plurality of inks of different primary colors to generate a spectrum of colors. For example, many color printers use four ink colors: cyan (C), magenta (M), yellow (Y) and black (K). Color images are formed on a receiving substrate or medium by placing combinations of zero or more dots of C, M, Y or K ink at each pixel location. However, since dot placement can be less than ideal, various artifacts such as banding can occur.

BRIEF DESCRIPTION OF DRAWINGS

FIG. 5 is a schematic illustration of an embodiment of a halftone threshold array that can be associated with the pixel array of FIG. 2.

FIG. 6 is a schematic flow diagram of an embodiment of a procedure for printing black regions.

DETAILED DESCRIPTION OF THE DISCLOSURE

Figure 1:
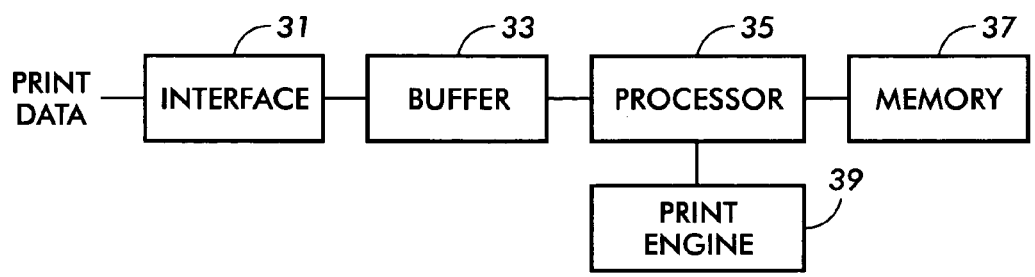
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrophotographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

Figure 2:
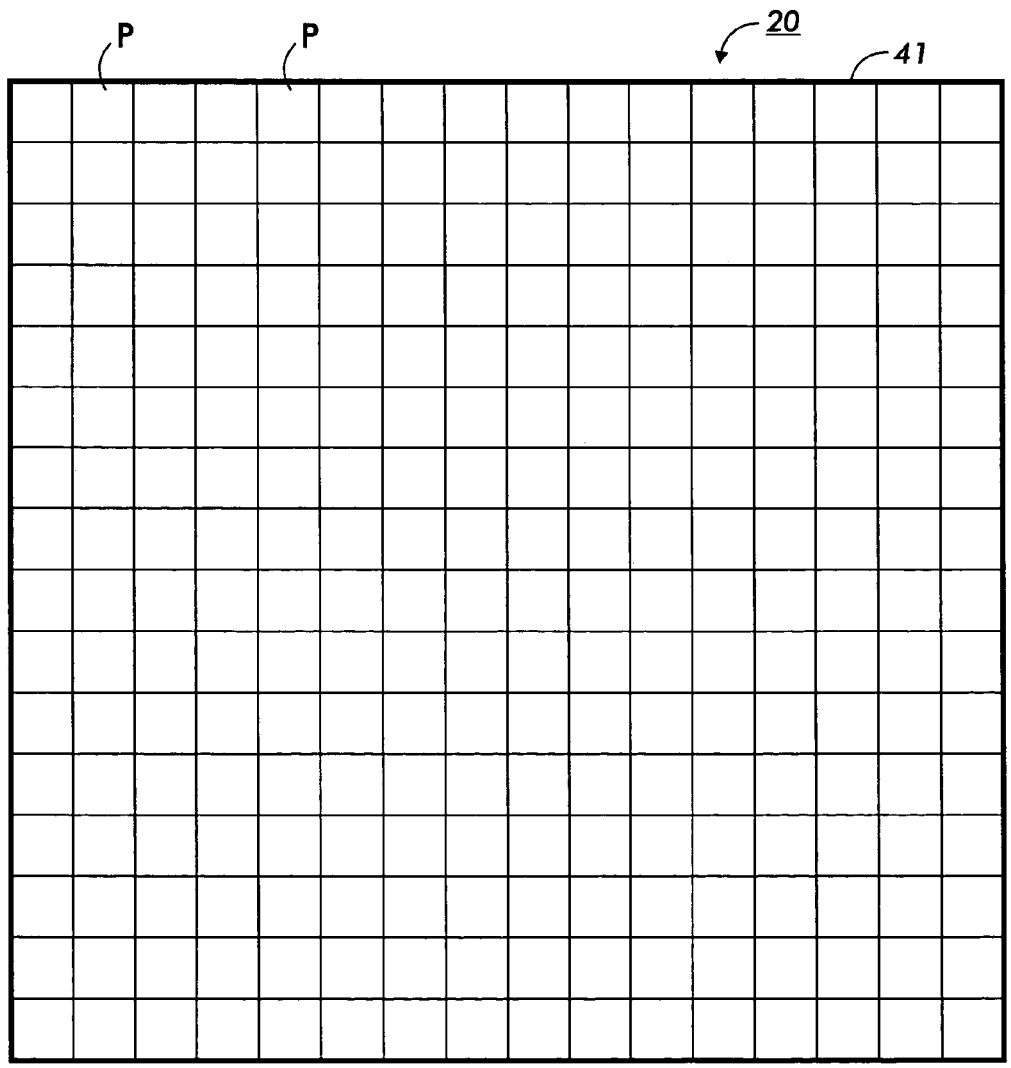
FIG. 2 is a schematic illustration of an embodiment of a pixel array.

FIG. 2 is a schematic illustration of an embodiment of an array 20 of pixel locations P that can be used to define the locations on a print output medium 41 that can be marked or printed. A marking of a particular primary color (e.g., cyan magenta, yellow or black) that is printed or deposited at a pixel location can be conveniently called a dot.

Each pixel location P can, for example, be marked or printed with (a) one or more non-black color dots (e.g., cyan, magenta or yellow), (b) a black dot by itself, or (c) a black dot and at least one non-black color dot.

Print data typically comprises continuous tone data (such as 32-bit or 24-bit pixel data), and halftoning (e.g., using one or more halftone threshold arrays) is commonly employed to map or transform continuous tone data to a halftoned bit map that contains one bit per pixel per primary color plane, for example. In this disclosure, it is contemplated that some of the black dots in the halftoned bit map are replaced with a process black dot, while one or more non-black dots is added to each of other black dots in the halftoned bit map. A process black dot comprises for example a combination of a cyan dot, a magenta dot and a yellow dot. A combination of a black dot and at least one non-black dot can be conveniently called a black plus non-black dot, and can comprise for example a black dot and a single non-black dot, or a black dot and a plurality of non-black dots. In this manner, some black dots are replaced with process black dots, while other black dots are replaced with black plus non-black dots.

Figure 3:
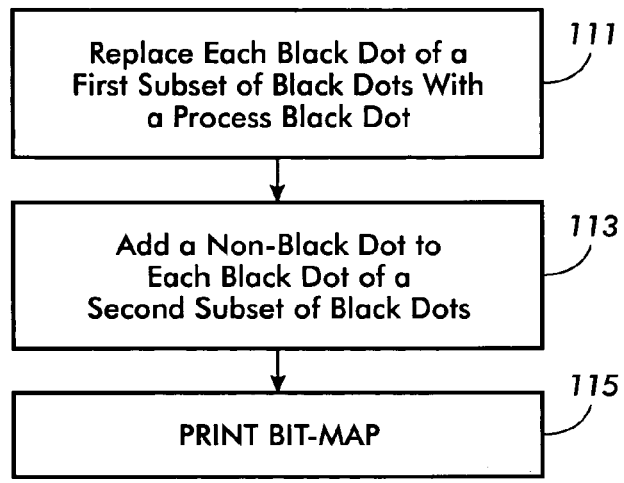
FIG. 3 is a schematic flow diagram of an embodiment of a procedure for printing black pixels.

FIG. 3 is a schematic flow diagram of an embodiment of a procedure for printing black pixels. At 111 each of the black dots of a first subset of the black dots of a bit map for a predetermined area is replaced with a process black dot. At 113 a non-black dot is added to each of the black dots of a second subset of the black dots of the bit map for the predetermined area. At 115 the bit map is printed.

The black dots of the first subset (which are replaced with process black dots) can comprise a percentage of all the black dots that tends to generally decrease as the ratio of black coverage to total coverage in the predetermined area increases. Also, the black dots of the second subset (to which a non-black dot is added) can comprise a percentage of all the black dots that tends to generally increase as the ratio of black coverage to total coverage in the predetermined area increases.

By way of illustrative example, the first and second subsets can be mutually exclusive so as to be non-overlapping. In other words, each subset comprises black dots that are not in the other subset. Also, the combination of the first and second subsets can comprise all or less than all of the black dots, whereby some of the black dots are not replaced with black dots and do not have a non-black dot added thereto.

The black dots that are replaced with process black dots can be generally uniformly distributed. Similarly, the black dots to which a non-black dot is added can be uniformly distributed. For example, a stochastic halftone threshold array or screen can be conveniently employed.

By way of illustrative example, determining whether a black dot is replaced with a process black dot or has a non-black dot added to it can be accomplished by halftoning continuous tone print data wherein each of the black values in the corresponding continuous tone data has been replaced with (a) a black plus non-black value kcmy that has been determined as a function of the relative amount or coverage of black in the continuous tone data, e.g., the ratio of black coverage to total color coverage, and (b) a process black value cmy that comprises the difference between the black value and the black plus non-black value.

For the illustrative example of a CMYK device that provides for eight possible colors for a pixel, total continuous tone color coverage for a pixel comprises:

TOTAL=$bk+cm+cy+my+c+m+y$ wherein bk=black, cm=blue (cyan+magenta), cy=green (cyan+yellow), my=red (magenta+yellow), c=cyan, m=magenta, y=yellow.

The relative amount of black coverage is:

BK_REL=$bk$/TOTAL

For the illustrative example wherein color values and coverage comprise scalars in the range of 0 to 255, the relative amount of black can be scaled to [0, 255]:

BK_SCALED=($bk$/TOTAL)*255

The relative amount of black (BK_REL or BK_SCALED) can be used to index a look-up table that returns a black plus non-black value kcmy:

kcmy=TABLE [BK_SCALED]

The black plus non-black value can increase as the relative amount of black BK_SCALED increases. For example, the black plus non-black value kcmy can be a linear function of the relative amount of black, or kcmy can be sigmoid function of the relative amount of black.

The process black value cmy can comprise the difference between the black value bk and the black plus non-black value kcmy:

cmy=bk−kcmy for the illustrative example wherein bk and kcmy are scalars. In this manner, the process black value cmy decreases as the relative amount of black coverage increases.

The modified continuous tone data is halftoned, for example to distribute the replacement process black dots and the black dots to which a non-black dot has been added. For the illustrative example wherein the color values, the black plus non-black values kcmy, and the process black values cmy, and the threshold values are scaled to the same range such as [0, 255], the replacement process black dots can be printed at pixel locations having associated threshold values in the range of 0 to cmy−1, and the black dots and additional non-black dots can be printed at pixel locations having associated threshold values in the range of cmy to cmy+kcmy−1, for example. As described further herein the black dots to which a particular non-black color dot is added can also be generally uniformly distributed, for example by use of a stochastic halftone threshold value array. In this manner, for an area of uniform color, the black plus non-black value kcmy generally represents the portion of black dots in the area to which non-black dots are added, while the process black value cmy represents the portion of black dots in the area that are replaced with process black dots. To the extent that kcmy and cmy are scalars in the range [0, 255], kcmy/255 would be the fraction of black dots to which non-black dots are added while cmy/255 would be the fraction of black dots that are replaced with process black dots.

Figure 4:
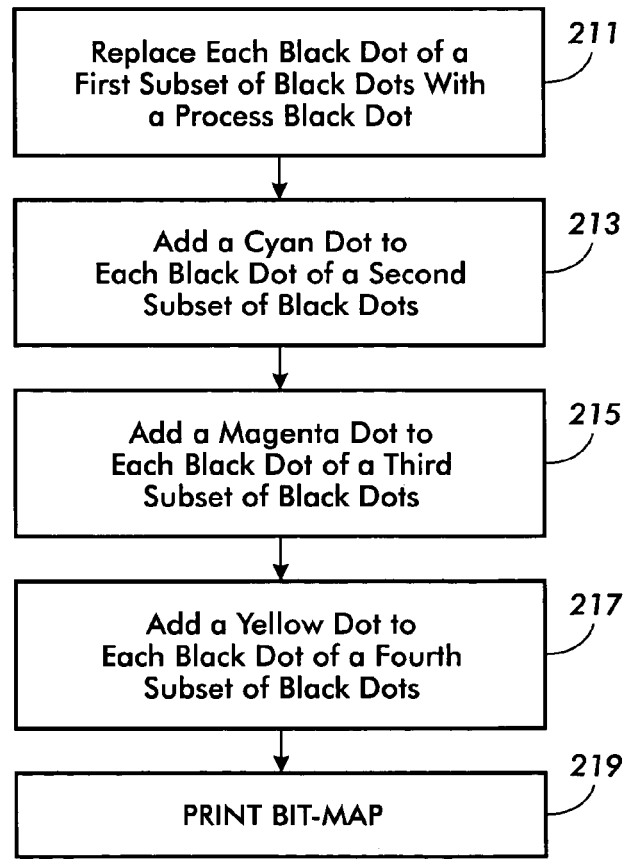
FIG. 4 is a schematic flow diagram of an embodiment of another procedure for printing black pixels.

FIG. 4 is a schematic flow diagram of an embodiment of a procedure for printing black pixels. At 211 each of the black dots of a first subset of the black dots of a bit map for a predetermined area is replaced with a process black dot. At 213 a cyan dot is added to each of the black dots of a second subset of the black dots of the bit map for the predetermined area. At 215 a magenta dot is added to each of the black dots of a third subset of the black dots of the bit map for the predetermined area. At 217 a yellow dot is added to each of the black dots of a fourth subset of the black dots of the bit map for the predetermined area. At 219 the bit map is printed.

The black dots of the first subset (which are replaced with process black dots) can comprise a percentage of all the black dots that tends to generally decrease as the ratio of black coverage to total coverage in the predetermined area increases. Also, the black dots of the second through fourth subsets (to which a cyan, magenta or yellow dot is added) can comprise a percentage of all the black dots that tends to generally increase as the ratio of black coverage to total coverage in the predetermined area increases.

By way of illustrative example, the first, second, third and fourth subsets can be mutually exclusive so as to be non-overlapping. In other words, each subset comprises black dots that are not in any of the other subsets. Also, the combination of the first through fourth subsets can comprise all or less than all of the black dots, whereby some of the black dots are not replaced with black dots and do not have a non-black dot added thereto.

The black dots that are replaced with process black dots can be generally uniformly distributed. Similarly, the black dots to which cyan dots are added can be generally uniformly distributed. Also, the black dots to which magenta dots are added can be generally uniformly distributed, and the black dots to which yellow dots are added can be generally uniformly distributed.

By way of illustrative example, determining whether a black dot is replaced with a process black dot or has a cyan, magenta or yellow dot added to it can be accomplished by halftoning continuous tone print data wherein each of the black values in the corresponding continuous tone data has been replaced with (a) a black plus cyan value kc, (b) a black plus magenta value km, (c) a black plus yellow value ky, wherein the sum of kc, km, ky has been determined as a function of the relative amount or coverage of black in the continuous tone data, e.g., the ratio of black coverage to total color coverage, and (d) a process black value cmy that comprises the difference between the black value and the sum of the black plus cyan value, the black plus magenta value, and the black plus yellow value.

The process black value cmy can be determined as described previously relative to the procedure of FIG. 3 (e.g., cmy=bk−kcmy).

The black plus cyan value kc, the black plus magenta value km and the black plus yellow value ky can be determined by first determining a black plus non-black value kcmy as described previously relative to the procedure of FIG. 3 (e.g., kmcy=TABLE [BK_SCALED]), and then dividing that value into sub-values, one each for cyan, magenta and yellow. By way of illustrative example, the black plus cyan value kc, the black plus magenta value km and the black plus yellow value ky can be equal, such that:

kc=km=ky=kcmy/3

The values cmy, kcmy, kc, km, ky can be expressed as percentages or scalars, depending upon implementation. For example, these values can be scaled to [0, 255] for an implementation wherein color values (e.g., bk, cm, cy, my, c, m, y) are in the range of 0 to 255.

FIG. 5 schematically illustrates an embodiment of a stochastic halftone threshold value that can be employed as follows for the illustrative example wherein the color values, the values cmy, kc, km, ky and the threshold values are scaled to the same range such as [0, 255], and wherein t is the threshold value:

```
if cmy>t              C, M Y dots are on
else if cmy+ck>t      K, C dots are on
else if cmy+ck+mk>t          K, M dots are on
else if cmy+ck+mk+yk>t  K, Y dots are on
else if cmy+ck+mk+yk+cm>t         C, M dots are on
else if cmy+ck+mk+yk+cm+cy>t      C, Y dots are on
else if cmy+ck+mk+yk+cm+cy+my>t   M, Y dots are on
else if cmy+ck+mk+yk+cm+cy+my+c>t  C dot is on
else if cmy+ck+mk+yk+cm+cy+my+c+m>t      M dot is on
else if cmy+ck+mk+yk+cm+cy+my+c+m+y>t    Y dot is on
else no dot is on (white dot)
```

Pursuant to the foregoing, replacement process black dots can be printed at pixel locations having associated threshold values in the range of 0 to cmy−1, and black dots to which cyan are added can be printed at pixel locations having associated threshold values in the range of cmy to cmy+kc−1. Black dots to which magenta dots are added can be printed at pixel locations having associated threshold values in the range of cmy+kc to cmy+kc+km−1, and black dots to which yellow dots are added can be printed at pixel locations having associated threshold values in the range of cmy+kc+km to cmy+kc+km+ky−1, for example. In this manner, for an area of uniform color, the black plus cyan value kc generally represents the portion of black dots in the area to which cyan dots are added, the black plus magenta value km generally represents the portion of black dots in the area to which magenta dots are added, the black plus yellow value ky generally represents the portion of black dots in the area to which yellow dots are added, the process black value cmy represents the portion of black dots in the area that are replaced with process black dots. To the extent that kc, km, ky and cmy are scalars in the range [0, 255], kc/255 would be the fraction of black dots to which cyan dots are added, km/255 would be the fraction of black dots to which magenta dots are added, ky/255 would be the fraction of black dots to which yellow dots are added, and cmy/255 would be the fraction of black dots that are replaced with process black dots.

FIG. 6 is a schematic flow diagram of an embodiment of a procedure for printing halftoned bit map data wherein at least some of black dots have been replaced with process black or have had a non-black color added thereto, for example as described previously. The procedure of FIG. 6 selectively converts process black dots (e.g., pixels that contain a cyan dot, a magenta dot and a yellow dot) and black plus non-black dots (i.e., black dots that have an added non-black color dot) to black dots, so that black regions such as black text tend to be printed with no non-black color.

At 311 each process black dot (which can be combination of a cyan dot, a magenta dot and a yellow dot) and each black plus non-black dot (which can be combination of a black dot and a non-black dot) of a halftoned bit map is changed to a black dot if each of first and second adjacent dots on either side of such process black dot or black plus non-black dot along a predetermined axis (e.g., a column axis, a row axis, or a diagonal axis) comprises a black dot, a black plus non-black dot, a process black dot, or a white dot (which is the absence of both black and non-black color). At 313 the bit map is printed.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of printing comprising:
    replacing each of black dots of a first subset of black dots of a halftoned bit map for a predetermined area with a process black dot;
    adding a non-black dot to each of black dots of a second subset of black dots of the bit-mapped data;
    wherein the halftoned bit map is generated by halftoning continuous tone data;
    wherein the black dots of the second subset comprises a percentage of all the black dots that tends to generally increase as a ratio of black coverage to total coverage in the predetermined area increases;
    wherein the second subset comprises black dots that are not in the first subset; and
    printing the bit map.

2. The method of claim 1 wherein the first subset and the second subset comprise all of the black dots in the bit map.

3. The method of claim 1 wherein the black dots of the first subset are generally uniformly distributed.

4. The method of claim 1 wherein the black dots of the second subset are generally uniformly distributed.

5. The method of claim 1 wherein:
    the black dots of the first subset are generally uniformly distributed;
    the black dots of the second subset are generally uniformly distributed.

6. A method of printing comprising:
    replacing each of black dots of a first subset of black dots of a bit map for a predetermined area with a process black dot;
    adding a non-black dot to each of black dots of a second subset of black dots of the bit-mapped data;
    wherein the second subset comprises black dots that are not in the first subset; and
    printing the bit map.

7. The method of claim 6 wherein the first subset and the second subset comprise all of the black dots in the bit map.

8. The method of claim 6 wherein the black dots of the first subset are generally uniformly distributed.

9. The method of claim 6 wherein the black dots of the second subset are generally uniformly distributed.

10. The method of claim 6 wherein:
    the black dots of the first subset are generally uniformly distributed;
    the black dots of the second subset are generally uniformly distributed.

11. A method of printing comprising:
    replacing each of black dots of a first subset of black dots of a halftoned bit map for a predetermined area with a process black dot;
    adding a cyan dot to each of black dots of a second subset of black dots of the halftoned bit-map;
    adding a magenta dot to each of black dots of a third subset of black dots of the halftoned bit-map;
    adding a yellow dot to each of black dots of a fourth subset of black dots of the halftoned bit-map;
    wherein the halftoned bit map is generated by halftoning continuous tone data;
    wherein the black dots of the second subset, the third subset and the fourth subset comprises a percentage of all the black dots that tends to generally increase as a ratio of black coverage to total coverage in the predetermined area increases; and
    printing the bit map.

12. The method of claim 11 wherein the first through fourth subsets comprise all of the black dots in the bit map.

13. The method of claim 11 wherein the black dots of the first subset are generally uniformly distributed.

14. The method of claim 11 wherein the black dots of the second subset are generally uniformly distributed.

15. The method of claim 11 wherein the black dots of the third subset are generally uniformly distributed.

16. The method of claim 11 wherein the black dots of the fourth subset are generally uniformly distributed.

17. The method of claim 11 wherein:
    the black dots of the first subset are generally uniformly distributed;
    the black dots of the second subset are generally uniformly distributed;

the black dots of the third subset are generally uniformly distributed; and the black dots of the fourth subset are generally uniformly distributed.

18. A method of printing comprising:

modifying continuous tone data for a predetermined area such that halftoning of the modified continuous tone data produces a halftoned bit map wherein (a) each of black dots of a first subset of black dots is replaced with a process black dot, (b) a cyan dot is added to each of black dots of a second subset of black dots, (c) a magenta dot is added to each of black dots of a third subset of black dots, and (c) a yellow dot is added to each of black dots of a fourth subset of black dots;

halftoning the modified continuous tone data to produce halftoned bit map; and printing the bit map.

* * * * *